US009516617B1

(12) United States Patent
Dollahan, Jr.

(10) Patent No.: US 9,516,617 B1
(45) Date of Patent: Dec. 6, 2016

(54) HIGH-SPEED PLATFORM TELEMETRY SYSTEM

(71) Applicant: THE BOEING COMPANY, Chicago, IL (US)

(72) Inventor: Edward W. Dollahan, Jr., Lakewood, CA (US)

(73) Assignee: THE BOEING COMPANY, Chicago, IL (US)

(*) Notice: Subject to any disclaimer, the term of this patent is extended or adjusted under 35 U.S.C. 154(b) by 0 days.

(21) Appl. No.: 14/932,935

(22) Filed: Nov. 4, 2015

(51) Int. Cl.
H04B 1/00 (2006.01)
H04B 7/15 (2006.01)
H04W 24/00 (2009.01)
H04W 56/00 (2009.01)
H04B 7/185 (2006.01)

(52) U.S. Cl.
CPC ..... H04W 56/0045 (2013.01); H04B 7/18506 (2013.01); H04W 56/0055 (2013.01)

(58) Field of Classification Search
CPC .................................. H04B 7/18506
USPC ..................... 455/11.1, 456.1, 63.1
See application file for complete search history.

(56) References Cited

U.S. PATENT DOCUMENTS 5,943,606 A * 8/1999 Kremm ............ H04B 7/01 342/358
7,852,905 B2 * 12/2010 Underbrink ...... H04B 1/7093 375/136
8,880,077 B2 * 11/2014 Oga ................. H04B 1/7113 455/226.1
2002/0013156 A1 * 1/2002 Yamamoto ........ H04B 7/01 455/522
2007/0161347 A1 * 7/2007 Ma ............... H04B 7/18506 455/11.1
2009/0036144 A1 * 2/2009 Wong .............. H04B 7/01 455/456.3
2009/0268828 A1 * 10/2009 Roberts ............ G01S 11/10 375/260
2010/0311424 A1 * 12/2010 Oga ............... H04B 1/7113 455/440
2011/0217934 A1 * 9/2011 Oga ............... H04B 7/01 455/62

OTHER PUBLICATIONS

J. R. Lesh, "Tracking Loop and Modulation Format Considerations for High Rate Telemetry", DSN Progress Report 42-44, Jan. and Feb. 1978, pp. 117-124.
Z. G. Shi, S. H. Hong, K. S. Chen, "Tracking Airborne Targets Hidden in Blind Doppler Using Current Statistical Model Particle Filter", Progress in Electromagnetics Research, PIER 82, 227-240, 2008.

(Continued)

Primary Examiner — Tilahun B Gesesse
(74) Attorney, Agent, or Firm — Francisco A. Rubio-Campos; Apogee Law Group P.C.

(57) ABSTRACT

A high-speed platform telemetry system ("HSPTS") within a high-speed platform ("HSP"), for compensating for high Doppler in a telemetry stream is disclosed. The HSP is in signal communication with a first station, the telemetry stream is transmitted between the HSP and the first station, and the high Doppler is created by the HSP as the HSP moves along a travel path that passed near the first station. The HSPTS may include a platform transmitter, an on-board storage device having a real-time Doppler map database and navigation information corresponding to the travel path of the HSP, a position location device, a processor in signal communication with the position location device and on-board storage device, and a frequency offset circuit in signal communication with the platform transmitter and processor.

20 Claims, 4 Drawing Sheets

(56) References Cited

OTHER PUBLICATIONS

Ying Fu, Ziyue Tang, Yongjian Sun, "Heterogeneous Multi-Sensor Joint Tracking of Target Buried in Aew Radar Blind Doppler Zone", Journal of Theoretical and Applied Information Technology, vol. 49, No. 3, Mar. 31, 2013.
J. R. Lesh, "Tracking Loop and Modulation Format Considerations for High Rate Telemetry", DSN Progress Report 42-22, Jan. and Feb. 1978, pp. 117-124.
"Technical Documentary Report", Defense Documentation Center for Scientific and Technical Information, Unclassified AD 408920, Space Systems Division, Air Force Systems Command, United States Air Force, Dec. 13, 1962, pp. 1-70.
"Final Report on Range Instrumentation Planning Study", Technical Documentary Report No. ESD-TDR-63-354, vol. 5: Tracking, Telemetry, and Command (TTC), Oct. 1963, pp. 1-268.
Shaohua Chen, Jiaqi Li, Ju Wang, "A Scheme on PN Code Tracking of DS/FH Signals for Telemetry, Tracking, and Commanding (TT &C)", I.J. Wireless and Microwave Technologies, 2011, 4, 10-18.
Ravindra Babu, Jinling Wang, "Analysis of INS Derived Doppler Effects on Carrier Tracking Loop," Journal of Navigation, School of Surveying and Spatial Information Systems, Aug. 2005, pp. 1-14.
Vinh Dang, Ozlem Kilic, "Joint DoA-Range-Doppler Tracking of Moving Targets Based on Compressive Sensing", The Catholic University of America, AP-S & USNC-URSI, Jul. 6-11, 2014, pp. 1-22.
Mark Beckman, "Orbit Determination Issues for Libration Point Orbits", Libration Point Orbits and Applications, Parador d'Aiguablava, Girona, Spain, Jun. 10-14, 2002, pp. 1-11.
Kwang-Hoon Kim, Gyu-In Jee, Jong-Hwa Song, "Carrier Tracking Loop using the Adaptive Two-Stage Kalman Filter for High Dynamic Situations", International Journal of Control, Automation, and Systems, vol. 6, No. 6, pp. 948-953, Dec. 2008.
Shexiang Ma, Yaping Feng, "Design of Frequency Tracking Loop for Satellite-Based AIS", Journal of Computers, vol. 9, No. 7, Jul. 2014, pp. 1639-1647.
Toshiaki Tsujii, Takeshi Fujiwara, Yoshimitsu Suganuma, Hiroshi Tomita, Ivan Petrovski, "Development of INS-Aided GPS Tracking Loop and Flight Test Evaluation", SICE Journal of Control, Measurement, and System Integration, vol. 4, No. 1, pp. 015-021, Jan. 2011.
Qingchong Lin, "Doppler Measurement and Compensation in Mobile Satellite Communications Systems", Nughes Network Systems, 0-7803-5538-5/99/$ 10.00, 1999 IEEE, pp. 1-5.
Daniele Borio, Nadezda Sokolova, Gerard Lachapelle, "Doppler Measurement Accuracy in Standard and High-Sensitivity GNSS Receivers", IET Radar, Sonar, & Navigation, Nov. 2010, pp. 1-25.
"Doppler Tracking Loop Optimization Study", Technical Documentary Report, Space Systems Division, Air Force Systems Command, United States Air Force, Dec. 31, 1962, pp. 1-70.
Chuck Mcconaghy, "Doppler Tracking", WA6SYE, QEX—Mar./Apr. 2010, pp. 30-37.
Du Shi-Chuan, Shi Zhi-Guo, Zang Wei, Chen Kang-Sheng, "Using Interacting Multiple Model Particle Filter to Track Airborne Targets Hidden in Blind Doppler", Journal of Zhejiang University Science A, ISSN 1673-565X (Print), 1277-1282, Mar. 2007.
Dong K. Shin, Timothy T. Pham, "202, Rev. B, 34-m and 70-m Doppler", California Institute of Technology, DSN Telecommunications Link Design Handbook, pp. 1-20.
R. Sun, D. Maessen, J. Guo, E. Gill, "Enabling Inter-Satellite Communication and Ranging for Small Satellites" Small Satellite Systems and Services Symposium (4S), Funchal, Portugal, May 31-Jun. 4, 2010, pp. 1-15.
C. M. Kenyon, N. A. Goodman, "Range-Doppler Ambiguity Mitigation via Closed-Loop, Adaptive PRF Selection", 978-1-4244-7368-7/10/$26.00 2010 IEEE.
"Satellites Earth Stations and Systems (SES); Radio Frequency and Modulation Standard for Telemetry, Command and Ranging (TCR) of Geostationary Communications Satellites", Draft ETSI EN 301 926 V1.1.1 (Sep. 2001).
Kewen Sun, "Signal Acquisition and Tracking Loop Design for GNSS Receivers", InTech 2013, pp. 1-96, http://dx.doi.org/10.5772/55235.
Katayoon Mohseni Roozbahani, Ali Shahzadi, "Simulation of Doppler Frequency Estimation in Satellite Communication Using MIMO-OFDM Technique", Research Journal of Recent Sciences, vol. 3(1), 78-82, Jan. 2014.
"RF / Spread Spectrum Announces Sister Publication: Spread Spectrum Scene / Update" Spread Spectrum Scene, vol. 1, No. 5, Aug. 1992, pp. 1-20.
A. J. Van Dierendonck, Pat Fenton, Tom Ford, "Theory and Performance of Narrow Correlator Spacing in a GPS Receiver", Journal of the Institute of Navigation, vol. 39, No. 3, Fall 1992, pp. 265-283.
Mervi Bener, "Timing and Carrier Recovery", S-72.333 Postgraduate Course in Radio Communications, Fall 2004/Spring 2005, pp. 1-27.
Frank R. Leslie, "Tracking Accelerating Spacecraft Signals with the Wide Dynamic Demodulator" The Space Congress Proceedings, Paper 3, Apr. 1, 1984, pp. 3-11-3-47.

\* cited by examiner

HIGH-SPEED PLATFORM TELEMETRY SYSTEM

BACKGROUND

1. Field

This invention is generally related to telemetry systems, and in particular, to telemetry systems utilized by high-speed platforms.

2. Related Art

Known telemetry systems for high-speed platforms ("HSPs") such as, for example, launch vehicles, upper stages of launch vehicles, high-speed missiles, hypersonic vehicles, and other similar types of vehicles have known issues in dealing with the Doppler effects created by the HSPs. Specifically, a HSP introduces Doppler and Doppler rate issues in a transmitted telemetry stream that the HSP transmits to a remote station such as, for example a communication satellite (such as, for example, a relay satellite). These Doppler and Doppler rate issues generally cause complications in a receiver at the remote station because the frequency bandwidth of the receiver and the associated tracking loop, or loops, are generally not capable of dealing with the result of a high Doppler situation affecting the apparent received frequency of the telemetry stream. As such, these Doppler and Doppler rate issues generally cause the receiver to lose receiver lock on the telemetry stream coming from the HSP (generally known as a telemetry dropout) when the Doppler rate change is too high.

In FIG. 1, a system block diagram is shown of an example of an implementation of a known telemetry system 100 for a HSP 102 where the HSP 102 is an upper-stage of a launch vehicle. In this example, the telemetry system 100 includes a relay satellite 104, as the remote station above the surface of the Earth 106, and a ground station 108. The HSP 102 is shown as having been launched from a ground-based launch site 110 via a launch path 112 and then traveling along a flight path 114 (i.e., a travel path after separating from the lower-stage 116 of the launch vehicle) above the surface of the Earth 106 but below the altitude 118 of the relay satellite 104. In this example, the relay satellite 104 may be a near geostationary geosynchronous communication satellite orbiting at an altitude 118 of approximately 35,800 kilometers and the HSP 102 may be traveling along the flight path 114 at a velocity 120 that is, for example, greater than Mach 1. As an example, the relay satellite 104 may be a Tracking and Data Relay Satellite ("TDRS") spacecraft operated by the United States ("U.S") National Aeronautics and Space Administration ("NASA") operating at in the S, $K_u$, and $K_a$ frequency bands with a corresponding ground station 108 located at either White Sands Complex ("WSC") in southern New Mexico, Guam Remote Ground Terminal ("GRGT"), or Network Control Center located at Goddard Space Flight Center in Greenbelt, Md. The HSP 102 includes a platform transmitter 122 that is in signal communication with the relay satellite 104 via a signal path 124 and the relay satellite is also in signal communication with the ground station 108 via signal path 126, where the signal path 124 is a satellite uplink and the signal path 126 is a satellite downlink.

In an example of operation, the HSP 102 is moving along the flight path 114 at a high velocity 120 towards the relay satellite 104. While approaching the relay satellite 104, the HSP 102 is transmitting a telemetry stream 128 of telemetry data related to measurements made and other data collected at the HSP 102 by the on-board sensors of the HSP 102. This telemetry stream 128 is generally received by the relay satellite 104 via the satellite uplink 124 and then converted into a downlink telemetry stream 130 that is transmitted to the ground station 108 via the satellite downlink 126. It is appreciated by those of ordinary skill in the art that this conversion may include frequency and modulation conversations. Once received at the ground station 108, the telemetry data transmitted by the HSP 102 may be monitored and analyzed.

Unfortunately, as the HSP 102 approaches the perpendicular position 132 of the relay satellite 104 along the flight path 114, the Doppler rate affecting the transmitted telemetry stream 128 starts to change very rapidly to the point that it heavily taxes the ability of the tracking loop, or loops, in the receiver (not shown) to maintain a lock on the telemetry stream 128 and may generally result in a loss of lock and associated dropout of the telemetry stream 128. Based on how quickly the telemetry system 100 is designed to resynchronize utilizing satellite synchronization data such as, for example, satellite ephemeris data and transmitted synchronization world signals, a significant amount of valuable telemetry data may be irrevocably lost when a dropout of the telemetry steam 128 occurs.

This problem is increased when the HSP 102 reaches and passes the perpendicular position 132 of the relay satellite 104 along the flight path 114. This perpendicular position 132 is generally a Doppler transition position because prior to reaching the perpendicular position 132 of the replay satellite 104, the Doppler rate caused by the approaching HSP 102 is positive as long as the HSP 102 is still located at a position on the approaching side 134 of the perpendicular position 132 of the relay satellite 104 along the flight path 114. However, once the HSP 102 crosses the perpendicular position 132 to receding side 136 of the perpendicular position 132 of the relay satellite 104 along the flight path 114, the Doppler rate changes approximately instantaneous to a negative Doppler rate because the HSP 102 is receding away from the relay satellite 104. This translation position 132 is known as a Doppler blind spot and will generally result in loss of lock of the telemetry stream 128.

Known approaches to solve this problem are complex and generally involve complex designs of multiple tracking loops that increase the tracking loop bandwidths but reduce the receiver sensitivity and/or require detailed *a priori* knowledge of the Doppler and Doppler rate as a function of the specific trajectory (i.e., the flight path 114) of the HSP 102. As a result, this known approach requires prior coordination and planning with the communication satellite system organization ("CSSO") controlling and operating the relay satellite 104. As an example, currently the TDRS system is capable of creating a model for a flight path 114 of the HSP 102 that includes a planned Doppler schedule of the flight path 114 and compensates for the Doppler and Doppler rate issues at the relay satellite 104 and ground system 108. Unfortunately, this approach is controlled and operated on the CSSO (i.e., NASA in this example) side (i.e., the remote station side) and must be designed and implemented by CSSO. Additionally, if something happens and the HSP 102 does not fly at the appointed time that the model is designed for, the model is no longer valid and a new model must be designed for a future flight. In certain situations, this delay may be unacceptable.

As such, there is a need for a new system and method capable of compensating for high Doppler in a telemetry system where the high Doppler is caused by an HSP and does not have the limitations associated with the current systems.

SUMMARY

Disclosed is a high-speed platform telemetry system ("HSPTS") within a high-speed platform ("HSP"), for compensating for high Doppler in a telemetry stream. The HSP is in signal communication with a first station, the telemetry stream is transmitted between the HSP and the first station, and the high Doppler is created by the HSP as the HSP moves along a travel path that passed near the first station. The HSPTS may include a platform transmitter, an on-board storage device having a real-time Doppler map database and navigation information corresponding to the travel path of the HSP, a position location device, a processor in signal communication with the position location device and on-board storage device, and a frequency offset circuit in signal communication with the platform transmitter and processor.

The platform transmitter is configured to transmit the telemetry stream to the first station and operate within a predetermined frequency bandwidth having a center frequency of operation. The real-time Doppler map database includes a position for the first station and the position location device is configured to determine a plurality of positions of the HSP along the travel path of the HSP. The processor is configured to determine the position of the first station from the real-time Doppler map database, determine a plurality of relative rates of travel of the HSP along the travel path of the HSP from the first position of the HSP to the position of the first station, and determine a plurality of Doppler correction factors based on the plurality of relative rates of travel of the HSP. Moreover, the frequency offset circuit is configured to offset the center frequency of operation of the platform transmitter by the plurality of Doppler correction factors to create a plurality of Doppler corrected frequencies.

As an example of operation, the HSPTS performs a method that includes determining a first position for the HSP, determining the position of the first station, and determining a relative rate of travel of the HSP along the travel path of the HSP from the first position of the HSP to the position of the first station. The method also includes determining whether the relative rate of travel of the HSP is in a direction approaching or receding from the first station and then determining a Doppler correction factor based on the relative rate of travel of the HSP. The method then includes offsetting the first frequency of the platform transmitter by the Doppler correction factor to create a first Doppler corrected frequency and transmitting the telemetry stream to the first station receiver at the first Doppler corrected frequency.

Also disclosed is a method for securing telemetry stream data of HSP with the HSPTS because the first Doppler corrected frequency has a frequency value that will result in the telemetry stream being received at the first station receiver with an apparent frequency approximately equal to the first frequency and the received apparent frequency of the telemetry stream will appear to have approximately zero Doppler effect.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention may be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

Figure 1:
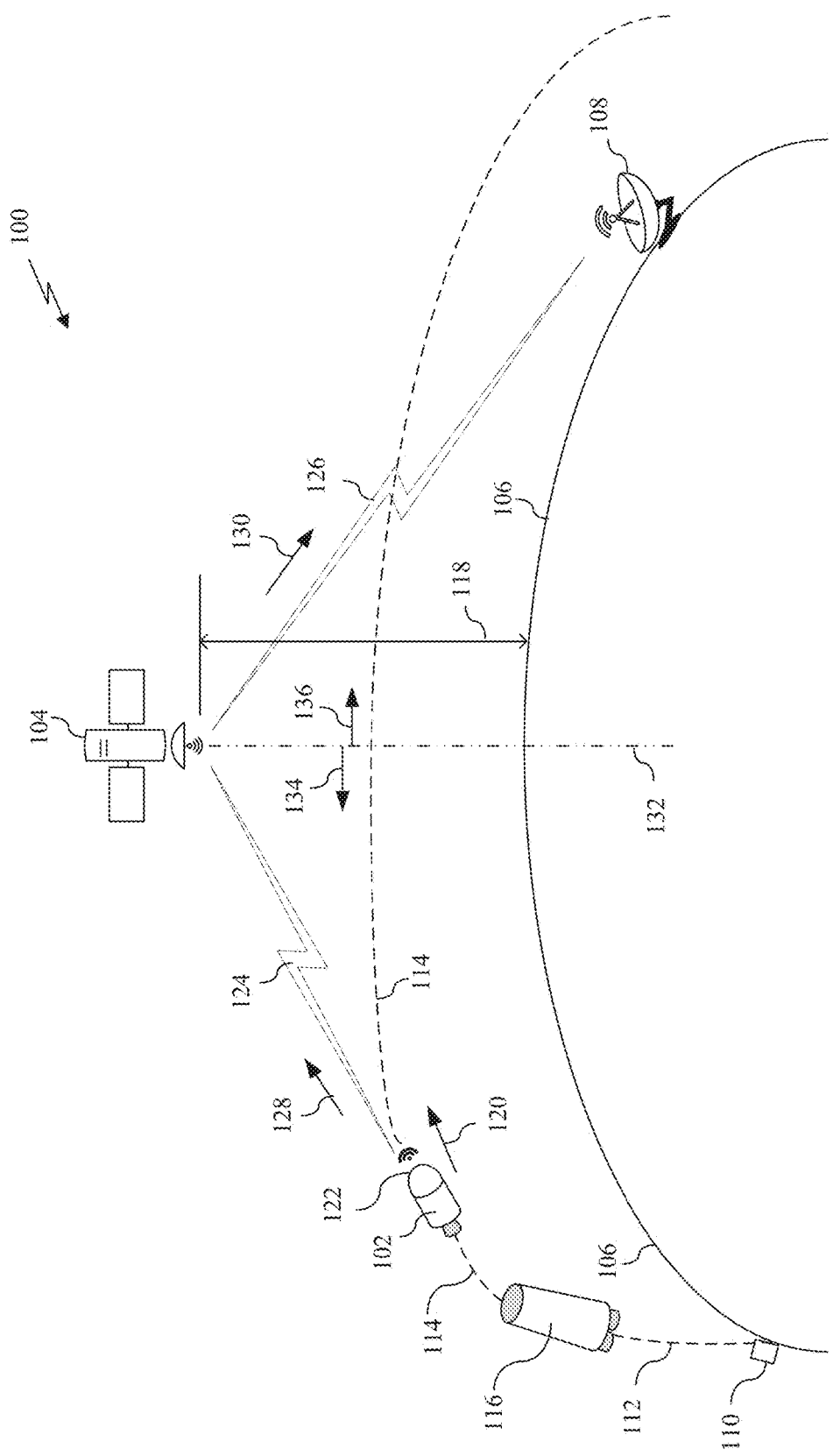
FIG. 1 is a system block diagram of an example of an implementation of a known telemetry system for a high-speed platform ("HSP") where the HSP is an upper-stage of a launch vehicle.

A high-speed platform telemetry system ("HSPTS") within a high-speed platform ("HSP"), for compensating for high Doppler in a telemetry stream is disclosed. The HSP is in signal communication with a first station, the telemetry stream is transmitted between the HSP and the first station, and the high Doppler is created by the HSP as the HSP moves along a travel path that passed near the first station. The HSPTS may include a platform transmitter, an on-board storage device having a real-time Doppler map database and navigation information corresponding to the travel path of the HSP, a position location device, a processor in signal communication with the position location device and the on-board storage device, and a frequency offset circuit in signal communication with the platform transmitter and processor.

The platform transmitter is configured to transmit the telemetry stream to the first station and operate within a predetermined frequency bandwidth having a center frequency of operation. The real-time Doppler map database includes a position for the first station and the position location device is configured to determine a plurality of positions of the HSP along the travel path of the HSP. The processor is configured to determine the position of the first station from the real-time Doppler map database, determine a plurality of relative rates of travel of the HSP along the travel path of the HSP from the first position of the HSP to the position of the first station, and determine a plurality of Doppler correction factors based on the plurality of relative rates of travel of the HSP. Moreover, the frequency offset circuit is configured to offset the center frequency of operation of the platform transmitter by the plurality of Doppler correction factors to create a plurality of Doppler corrected frequencies.

As an example of operation, the HSPTS performs a method that includes determining a first position for the HSP, determining the position of the first station, and determining a relative rate of travel of the HSP along the travel path of the HSP from the first position of the HSP to the position of the first station. The method also includes determining whether the relative rate of travel of the HSP is in a direction approaching or receding from the first station and then determining a Doppler correction factor based on the relative rate of travel of the HSP. The method then includes offsetting the first frequency of the platform transmitter by the Doppler correction factor to create a first Doppler corrected frequency and transmitting the telemetry stream to the first station receiver at the first Doppler corrected frequency.

Also disclosed is a method for securing telemetry stream data of the HSP with the HSPTS because the first Doppler corrected frequency has a frequency value that will result in the telemetry stream being received at the first station receiver with an apparent frequency approximately equal to the first frequency and the received apparent frequency of the telemetry stream will appear to have approximately zero Doppler effect.

Figure 2:
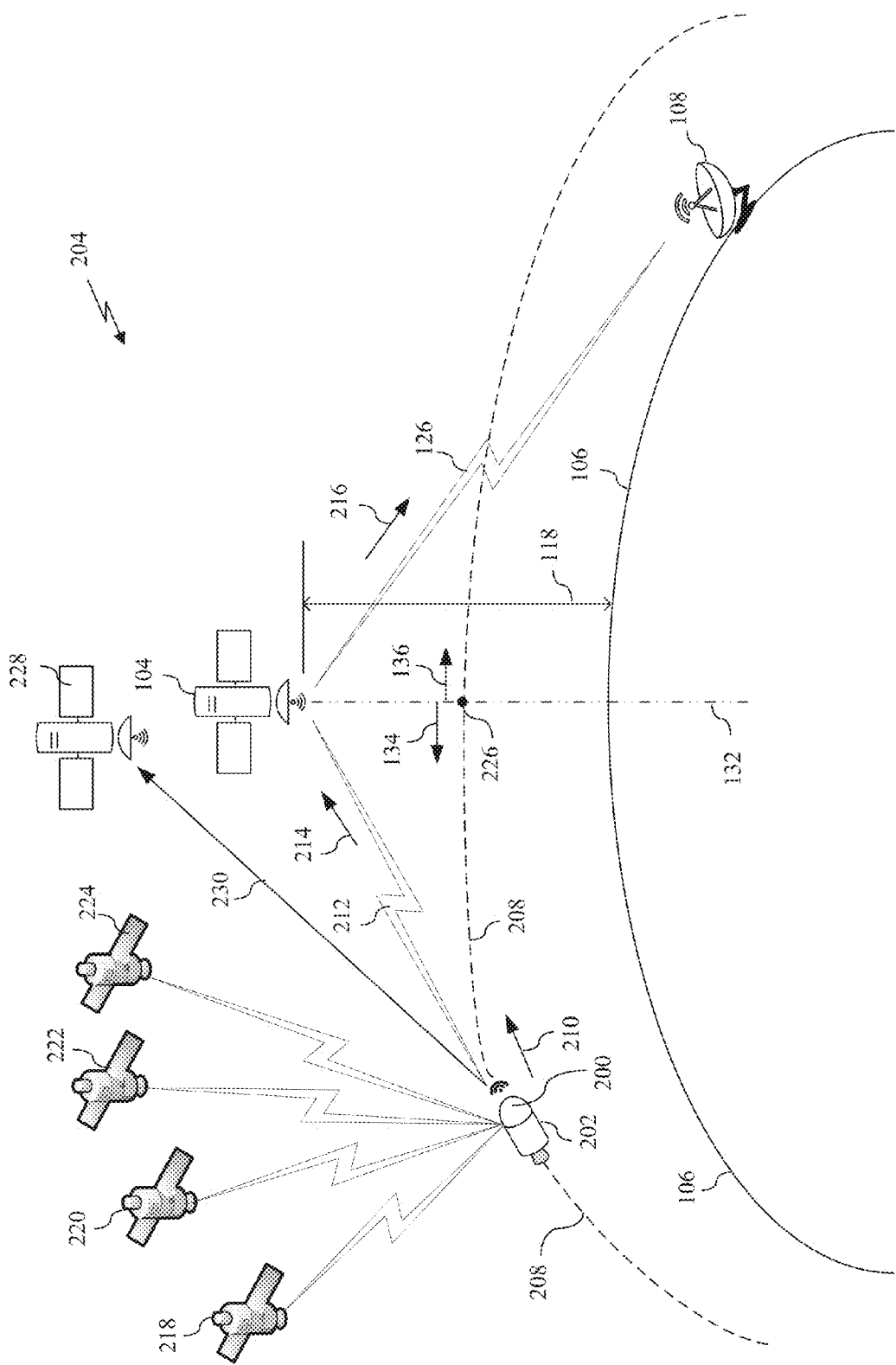
FIG. 2 is a system block diagram of an example of an implementation of a high-speed platform telemetry system ("HSPTS") within a HSP traveling along a flight path in accordance with the present disclosure.

Turning to FIG. 2, a system block diagram of an example of an implementation of a HSPTS 200 within a HSP 202 is shown. The HSPTS 200 is in signal communication with a telemetry system 204 via signal path 206. Similar to FIG. 1, in this example, the telemetry system 204 includes the relay satellite 104, as the remote station above the surface of the Earth 106, and a ground station 108. The HSP 202 is traveling along a flight path 208 above the surface of the Earth 106 but below the altitude 118 of the relay satellite 104. Again, in this example, the telemetry system 204 includes the relay satellite 104, as the remote station above the surface of the Earth 106, and a ground station 108. The relay satellite 104 may be a near geostationary geosynchronous communication satellite orbiting at the altitude 118 of approximately 35,800 kilometers and the HSP 202 may be traveling along the flight path 208 at a velocity 210 that is greater than, for example, Mach 1.

Again, as an example, the relay satellite 104 maybe a Tracking and Data Relay Satellite ("TDRS") spacecraft operated by the United States ("U.S") National Aeronautics and Space Administration ("NASA") operating at in the S, $K_u$, and $K_a$ frequency bands with a corresponding ground station 108 located at either White Sands Complex ("WSC") in southern New Mexico, Guam Remote Ground Terminal ("GRGT"), or Network Control Center located at Goddard Space Flight Center in Greenbelt, Md. The HSP 202 includes a platform transmitter (not shown), of the HSPTS 200, that is in signal communication with the relay satellite 104 via a signal path 212 and the relay satellite 104 is also in signal communication with the ground station 108 via signal path 126, where the signal path 212 is a satellite uplink and the signal path 126 is a satellite downlink.

As described earlier, the HSPTS 200 is configured to compensate for high Doppler in a telemetry stream 214 that is being transmitted by a platform transmitter (not shown but located within the HSPTS 200) to the relay satellite (i.e., a first station) 104 along the signal path 212 as the HSP 202 moves towards the relay satellite 104 at a high velocity 210. In an example of operation, while approaching the relay satellite 104, the HSP 202 is transmitting the telemetry stream 214 of telemetry data related to measurements made and other data collected at the HSP 202 by the on-board sensors of the HSP 202. This telemetry stream 214 is received by the relay satellite 104 via the satellite uplink signal path 212 and then converted into a downlink telemetry stream 216 that is transmitted to the ground station 108 via the satellite downlink signal path 126. It is appreciated by those of ordinary skill in the art that this conversion may include frequency and modulation conversations. Once received at the ground station 108, the telemetry data transmitted by the HSP 202 may be monitored and analyzed by users (not shown) associated with the ground station 108.

In this example, the platform transmitter initially transmits the telemetry stream 214 at a first frequency to a receiver (i.e., a first station receiver) on the relay satellite 104. The HSPTS 200 then determines a first position for the HSP 200. The HSPTS 200 may determine the first position with one or more position location devices that may include, for example, a global positioning system ("GPS") receiver in signal communication with a plurality of GPS satellites 218, 220, 222, and 224. The HSPTS 200 then, or before determining the first position for the HSP 200, determines the position of the relay satellite 104 that may be determined from an on-board real-time Doppler map database (not shown) stored on an on-board storage device (not shown) that is part of the HSPTS 200. The HSPTS 200 then determines the relative rate of travel of the HSP 202 along the flight path 208 (i.e., the flight path) of the HSP 202 from the first position of the HSP 202 to the position of the relay satellite 104. The HSPTS 200 then determines whether the rate of travel of the HSP 202 is in a direction approaching or receding from the relay satellite 104. If the HSPTS 200 determines that HSP 202 is at a position along the flight path 208 that is located on the approaching side 134 of the perpendicular position 132 of the relay satellite 104 and the velocity 210 is in a direction towards an intersection point 226 of the perpendicular position 132 of the relay satellite 104 and the flight path 208, the HSPTS 200 will determine that the rate of travel of the HSP 202 is in a direction approaching the relay satellite 104. Alternatively, if the HSPTS 200 determines that HSP 202 is at a position along the flight path 208 that is located on the receding side 136 of the perpendicular position 132 of the relay satellite 104 and the velocity 210 is in a direction away from the intersection point 226 of the perpendicular position 132 of the relay satellite 104 and the flight path 208, the HSPTS 200 will determine that the rate of travel of the HSP 202 is in a direction receding from the relay satellite 104. In both situations, as the HSP 202 approaches the intersection point 226 of the perpendicular position 132 of the relay satellite 104 along the flight path 208, the Doppler rate affecting the transmitted telemetry stream 214 starts to change very rapidly. The HSPTS 200 then determines a Doppler correction factor based on the determined relative rate of travel of the HSP 202 and on whether the relative rate of travel of the HSP 202 is in a direction approaching or receding from the relay satellite 104. Furthermore, the HSPTS 200 determines the Doppler correction factor by determining a positive value for the Doppler correction factor if the relative rate of travel of the HSP 202 is in a direction approaching the relay satellite 104 and determining a negative value for the Doppler correction factor if the relative rate of travel of the HSP 202 is in a direction receding from the relay satellite 104. The HSPTS 200 then offsets the first frequency of the platform transmitter by the determined Doppler correction factor to create a first Doppler corrected frequency. In this example, the first Doppler corrected frequency has a frequency value that will result in the telemetry stream 214 being received at the receiver of the relay satellite 104 (i.e., a first station receiver) with an apparent frequency approximately equal to the first frequency of the platform transmitter. The HSPTS 200 then transmits the telemetry stream 214 to the receiver of the relay satellite 104 at the first Doppler corrected frequency. As a result, when the receiver of the relay satellite 104 receives the telemetry stream 214 (at the position of relay satellite 104), the telemetry stream 214 will appear to have a received apparent frequency that has approximately zero Doppler effect because it will appear to be approximately equal to the first frequency transmitted by the platform transmitter without any Doppler.

As the HSP 202 approaches or recedes from the intersection point 226 (of the perpendicular position 132 of the relay satellite 104 and the flight path 208) along the flight path 208, the HSPTS 200 may continue to compensate for the changing Doppler and Doppler rate. Specifically, since the HSP 202 is moving along the flight path 208, the HSPTS 200 may set the first position of the HSP 202 as a previous position of the HSP 202 along the flight path 208, determine an updated position for the HSP 202 along the flight path 208, determine an updated relative rate of travel of the HSP 202 from the updated position for the HSP 202 to the position of the relay satellite 104, determine whether the updated relative rate of travel of the HSP 202 is in the direction approaching or receding from the relay satellite 104, and determine an updated Doppler correction factor based on the updated relative rate of travel of the HSP 202 along the flight path 208. The HSPTS 200 then offsets the first frequency of the platform transmitter by the updated Doppler correction factor to create a updated Doppler corrected frequency and transmits the telemetry stream 214 to the receiver of the relay satellite 104 at the updated Doppler corrected frequency. The HSPTS 200 then sets the updated position of the HSP 202 as the previous position of the HSP 202 and the HSPTS 200 repeats the process until the HSPTS 200 stops transmitting the telemetry stream 214.

Similar to the previous discussion related to the Doppler corrected frequency, the updated Doppler corrected frequency has a frequency value that will result in the telemetry stream 214 being received at the receiver of the relay satellite 104 with an updated apparent frequency approximately equal to the first frequency and the received updated apparent frequency will appear to have approximately zero Doppler effect because the received updated apparent frequency will appear to be approximately equal to the first frequency transmitted by the platform transmitter without any Doppler. Also similar to the previous discussion related to the Doppler correction factor, determining the updated Doppler correction factor includes determining an updated positive value for the updated Doppler correction factor if the relative rate of travel of the HSP 202 is in the direction approaching the relay satellite 104 (i.e., from the intersection point 226 of the perpendicular position 132 of the relay satellite 104 and the flight path 208) along the flight path 208 and determining an updated negative value for the updated Doppler correction factor if the relative rate of travel of the HSP 202 is in the direction receding from the relay satellite 104 (i.e., from the intersection point 226 of the perpendicular position 132 of the relay satellite 104 and the flight path 208).

Utilizing these process steps, the HSPTS 200 determines the updated Doppler correction factor by determining whether to switch from the updated positive value for the updated Doppler correction factor to the updated negative value for the updated Doppler correction factor if the updated position for the HSP 202 passes through a transition position (i.e., the intersection point 226 of the perpendicular position 132 of the relay satellite 104 and the flight path 208) along the flight path 208 of the HSP 202, where the intersection point 226 is the position along the flight path 208 of the HSP 202 that is nearest to the relay satellite 104 along the perpendicular position 132 of the relay satellite 104 from the intersection point 226.

Once the receiver of the relay satellite 104 receives the telemetry stream 214, the relay satellite 104 translates the received telemetry stream 214 to the satellite downlink signal 216 and transmits the downlink signal 216 to the ground station 108 with a transmitter (not shown) of the relay satellite 104. In this example, the first frequency of the platform transmitter of the HSPTS 200 is the center frequency of the telemetry stream 214 without any Doppler effects.

In this example the relay satellite 104 may be, for example, a tracking and data relay satellite ("TDRS"), Inmarsat, Iridium, or GlobalStar satellite. The HSP 202 may be, for example, a hypersonic vehicle, launch vehicle, upper-stage of a launch vehicle, or high-speed missile. Moreover, the on-board real-time Doppler map database may include HSP 202 and relay satellite 104 data that corresponds to velocity, acceleration, time, and time-base plus current relay satellite 104 ephemerides.

It is appreciated by those of ordinary skill in the art that HSPTS 200 will produce a telemetry stream 214 that is inherently secure because the Doppler correction factor for the transmitted frequency of operation of the telemetry stream 214 is determined based on the position of the relay satellite 104. As such, if a potential non-authorized observer satellite 228 were to receive part of the telemetry stream 230, the received telemetry stream 230 would appear to be encoded such that the telemetry stream 230 would appear to have a varying frequency that would be difficult if not almost impossible to be received by a receiver on the non-authorized observer satellite 228. Since the non-authorized observer satellite 228 is not in the same position as the relay satellite 104, the changing Doppler corrected frequency will not appear as the apparent frequency of the telemetry stream 214 with approximately zero Doppler effect (as seen at relay satellite 104) but will appear to the receiver of the non-authorized observer satellite 228 as an apparent signal that has quickly changing frequency values that are the result of improper Doppler correction at the non-authorized observer satellite 228. This is because the position of the non-authorized observer satellite 228 is different from the position of the relay satellite 104 so most of the data in the on-board real-time Doppler map database will not correspond to the non-authorized observer satellite 228 so the resulting calculations for correcting for Doppler and Doppler rate of the telemetry stream 214 will result in a telemetry stream 230 that will be very difficult for the receiver of the non-authorized observer satellite 228 to receive.

The circuits, components, modules, and/or devices of, or associated with, the HSPTS 200 are described as being in signal communication with each other, where signal communication refers to any type of communication and/or connection between the circuits, components, modules, and/or devices that allows a circuit, component, module, and/or device to pass and/or receive signals and/or information from another circuit, component, module, and/or device. The communication and/or connection may be along any signal path between the circuits, components, modules, and/or devices that allows signals and/or information to pass from one circuit, component, module, and/or device to another and includes wireless or wired signal paths. The signal paths may be physical, such as, for example, conductive wires, electromagnetic wave guides, cables, attached and/or electromagnetic or mechanically coupled terminals, semi-conductive or dielectric materials or devices, or other similar physical connections or couplings. Additionally, signal paths may be non-physical such as free-space (in the case of electromagnetic propagation) or information paths through digital components where communication information is passed from one circuit, component, module, and/or device to another in varying digital formats without passing through a direct electromagnetic connection.

Figure 3:
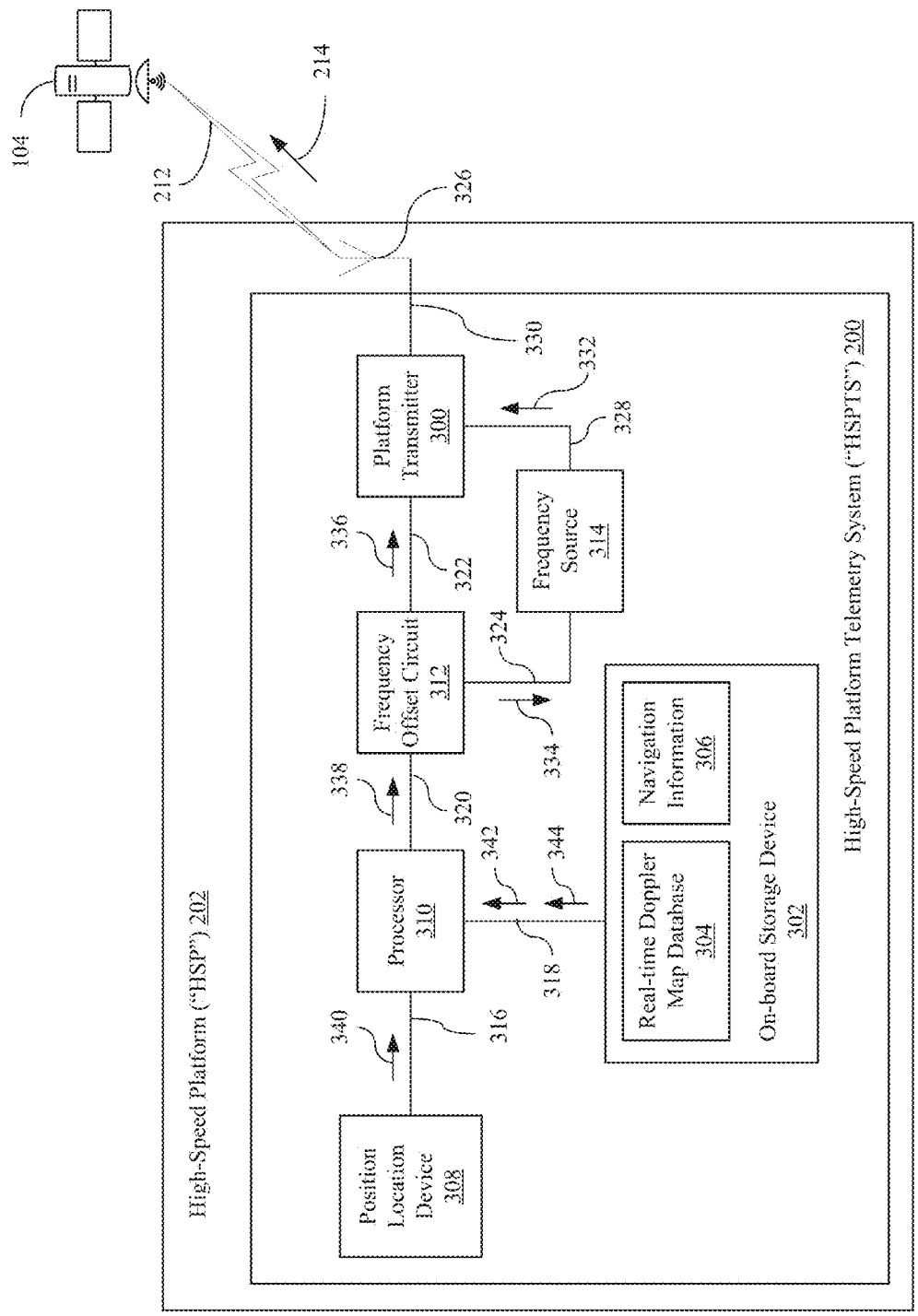
FIG. 3 is a system block diagram of an example of an implementation of the HSPTS, shown in FIG. 2, in accordance with the present disclosure.

Turning to FIG. 3, a system block diagram of an example of an implementation of the HSPTS 200 (shown in FIG. 2) is shown in accordance with the present disclosure. The HSPTS 200 is shown as a part of the HSP 200. As discussed earlier, the HSPTS 200 includes the platform transmitter 300, on-board storage device 302 having the on-board real-time Doppler map database 304 and a database of navigation information 306, the optional position location device 308, a processor 310, a frequency offset circuit 312, and a frequency source 314. In this example, the processor 310 is in signal communication with the position location device 308, on-board storage device 302, and frequency offset circuit 312 via signal paths 316, 318, and 320, respectively. The offset frequency circuit 312 may be in signal communication with the platform transmitter 300 and frequency source 314 via signal paths 322 and 324, respectively. The platform transmitter 300 may be in signal communication with the frequency source 314 and an antenna 326 via signal paths 328 and 330, respectively.

As discussed earlier with regard to FIG. 2, in FIG. 3, the real-time Doppler map database 304 is an on-board real-time Doppler map database that is stored on the on-board storage device 302 and includes a position for the first station (i.e., relay satellite 104) and HSP 202 and relay satellite 104 data that corresponds to velocity, acceleration, time, and timebase plus current relay satellite 104 ephemerides. The navigation information database 306 may include, for example, navigation information that includes information about the flight path 208, preprogrammed velocity and directional information for the HSP 202 to assist the HSP 202 travel along the flight path 208, and any needed attitude control data about the HSP 202. In this example, the real-time Doppler map database 304, navigation information database 305, or both, may be preprogrammed prior to launch of the HSP 202 and may be customized for the flight path 208 and/or the telemetry data that will be transmitted as the telemetry stream 214.

The position location device 308 may include one or more devices capable of determining the position of the HSP 202. Again an example of the position location device 308 may be a GPS receiver. The platform transmitter 300 may be any type of transmitter that is capable of communicating with the receiver of the relay satellite 104 and shifting the center frequency of operation of the platform transmitter 300 on a frequency control signal produced by the processor 310. As an example, the platform transmitter 300 may be S, Ku, or Ka band transmitter.

The frequency source 314 may be any type of frequency source such as, for example, an oscillator, synthesizer, multiplier, comb generator, etc. capable of producing a high-frequency stable frequency signal 332 that may be supplied to the platform transmitter 300 via signal path 328. In this example, the frequency source 314 may be controlled by a frequency offset signal 334 produced by the frequency offset circuit 312. In the case of the frequency source 314 being a voltage controlled oscillator or other type of voltage controlled frequency signal producing device, the frequency offset signal 334 may be a voltage signal that shifts the center frequency of operation of the frequency source in a way that is proportional to the magnitude of the voltage in the frequency offset signal 334. Alternatively, the frequency source 314 may produce the high-frequency stable frequency 332 without any control signal from the offset circuit 312. In this alternative example, an alternative frequency offset signal 336 may be supplied to the platform transmitter 300 instead.

The frequency offset circuit 312 may be a device capable of shifting the frequency of operation of either the frequency source 314 or platform transmitter 300. In the case of shifting the operating frequency of the frequency source 314 when the frequency source 314 is a voltage controlled oscillator, the frequency offset circuit 312 may be a logic circuit, component, or device that varies the voltage magnitude of the frequency offset signal 334 in response to receiving a frequency control signal 338 from the processor 310 via signal path 320. In the case of the frequency source 314 being a digital frequency synthesizer, the frequency offset circuit 312 may be a logic circuit, component, or device that varies the frequency of operation of the frequency source 314 via the frequency offset signal 334, which is a digital signal that changes the frequency of operation of the frequency source 314. In this example, the frequency offset circuit 312 may be a part of the processor 310. Alternatively, the frequency offset circuit 312 may be a device, component, or circuit capable of changing the frequency of operation of the platform transmitter 300 directly via the alternative frequency offset signal 336. In this alternative example, the platform transmitter 300 may include a logic circuitry, modulator, mixer, phase-shifter, frequency shifter, or combination of these, which are capable of shifting the frequency of the high-frequency stable frequency signal 332 so as to change the frequency of operation of the platform transmitter 300.

The processor 310 may be any type of processor, microprocessor, controller, microcontroller, digital signal processor ("DSP"), field programmable gate array ("FPGA") or other similar programmable device capable of receiving a position signal 340 from the position location device, a Doppler map signal 342 from the real-time Doppler map database 304, and navigation data signal 344 from the navigation information database 306 and, in response, produce the frequency control signal 338 based on the determined Doppler corrector factor that has been determined by the processor 310. In an example of operation, the processor 310 is capable of and configured to determine the position of the relay satellite 104 from the Doppler map signal 342 and determine the relative rate of travel of the HSP 202 along the flight path 208 of the HSP 202 from the first and updated positions of the HSP 202 to the position of the relay satellite 104. Additionally, the processor 310 is configured to determine whether the relative rate of travel of the HSP 202 is in a direction approaching or receding from the relay satellite 104 and determine the Doppler correction factor based on the relative rate of travel of the HSP 202. Moreover, the processor 310 is configured to determine a positive value for the Doppler correction factor if the relative rate of travel of the HSP 202 is in a direction approaching the relay satellite 104 and determine a negative value for the Doppler correction factor if the relative rate of travel of the HSP 202 is in a direction receding from the relay satellite 104. Furthermore, the processor 310 is configured to determine whether to switch from the updated positive value for the updated Doppler correction factor to the updated negative value for the updated Doppler correction factor if the updated position for the HSP 202 passes through a transition position (i.e., the intersection point 226) along the travel path (i.e., flight path 208) of the HSP 202.

Figure 4:
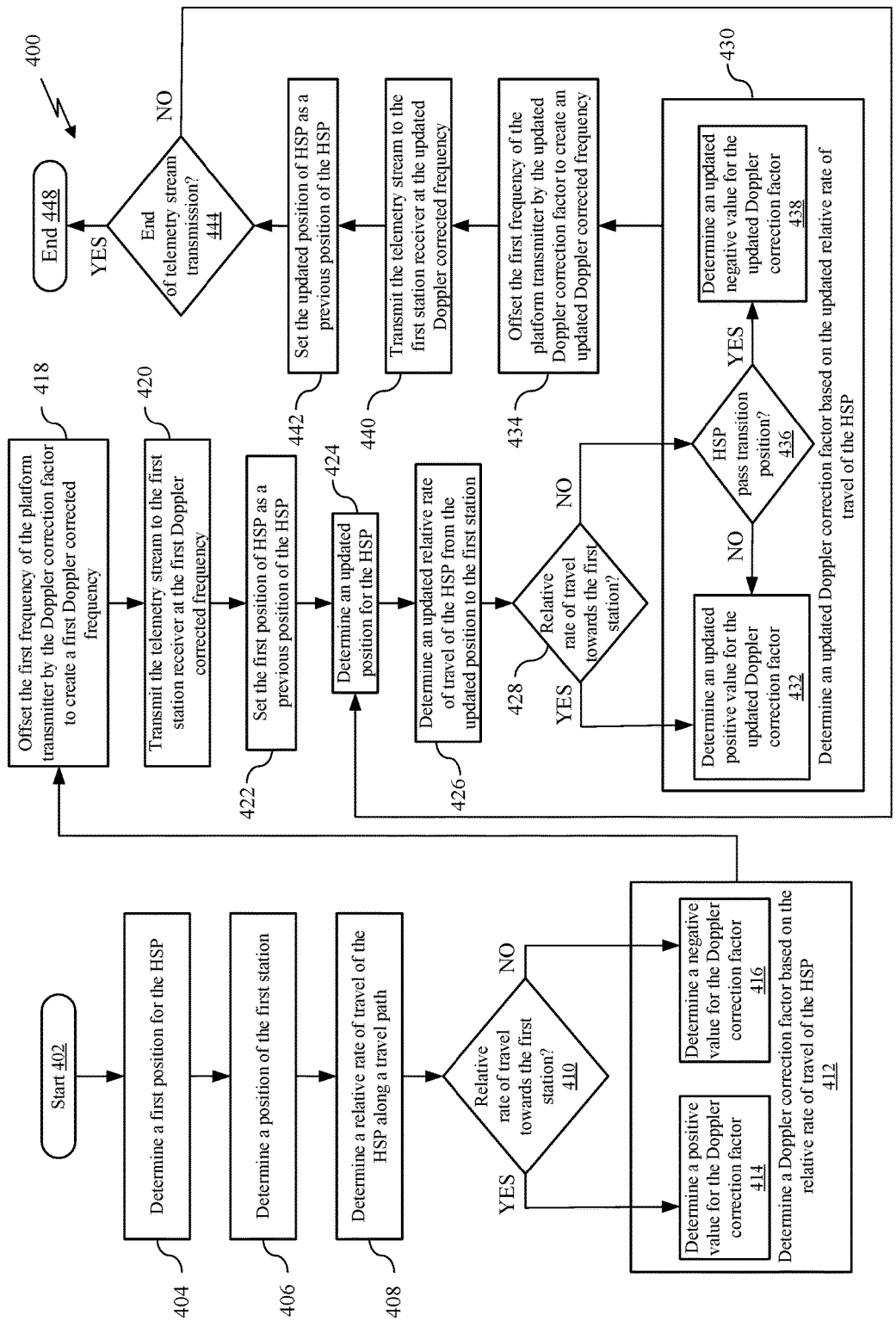
FIG. 4 is a flowchart of an example of an implementation of a method performed by the HSPTS, shown in FIGS. 2 and 3, in accordance with the present disclosure.

In FIG. 4, a flowchart 400 of an example of an implementation of a method performed by the HSPTS 200 (shown in FIGS. 2 and 3) is shown in accordance with the present disclosure. When the process starts 402, the HSPTS 200 determines a first position for the HSP 202, in step 404, from the position signal 340 (produced by the position location device 308) and determines the position of the first station (i.e., the relay satellite 104) from the Doppler map signal 342 (produced by the real-time Doppler map database 304) in step 406. The processor 310 then determines a relative rate of travel for the HSP 202 along the travel path (i.e., flight path 208), in step 408, and then determines whether the relative rate of travel is towards the relay satellite 104 in decision step 410. The processor then determines the Doppler correction factor based on the relative rate of travel of the HSP 202 in step 412. If the rate of travel is towards the relay satellite 104, the HSP 202 is approaching the relay satellite 104 so the processor 310 determines a positive value for the Doppler correction factor, in sub-step 414, and the process continues to step 418. Alternatively, if the rate of travel is not towards the relay satellite 104, the HSP 202 is receding from the relay satellite 104 so the processor 310 determines a negative value for the Doppler correction factor, in sub-step 416, and the process again continues to step 418.

In step 418, the processor 310 produces the frequency control signal 338 and supplies it to the frequency offset circuit 312 that produces either the frequency offset signal 334 that is supplied to the frequency source 314 or the alternative frequency offset signal 336 that is supplied to the platform transmitter 300. In response, the platform transmitter 300 changes (i.e., offsets) the first frequency of operation of the platform transmitter 300 by the Doppler correction factor to create the first Doppler corrected frequency. The platform transmitter 300 then transmits the telemetry stream 214 to the receiver of the relay satellite 104 at the first Doppler corrected frequency in step 420. The processor 310 then sets the first position of the HSP 202 as the previous position of the HSP 202, in step 422, determines an updated position for the HSP 202, in step 424, and determines an updated relative rate of travel of the HSP 202 from the updated position to the position of the relay satellite 104 in step 426. In decision step 428, the processor 310 determines if the relative rate of travel is towards the relay satellite 104. In response, the processor 310 determines an updated Doppler correction factor based on the updated relative rate of travel of the HSP 202 in step 430. If the relative rate of travel is towards the relay satellite 104, the processor 310 determines an updated positive value for the updated Doppler correction factor, in sub-step 432 of step 430, and the processes continues to step 434. If instead, the processor 310 determines that the relative rate of travel is not towards the relay satellite 104, the processor 310 determines if the HSP 202 has passed the transition position (i.e., the intersection point 226) in decision sub-step 436 of step 430. If the HSP 202 has not passed the transition position, the process returns to sub-step 432 and the processor 310 again determines an updated positive value for the updated Doppler correction factor. If instead, the HSP 202 has passed the transition position, the processor 310 determines an updated negative value for the updated Doppler correction factor in sub-step 438 of step 430 and the process continues to step 434.

In step 434, the frequency offset circuit 312 offsets the first frequency of the platform transmitter 300 by the updated Doppler correction factor to create an updated Doppler corrected frequency and the platform transmitter 300 transmits the telemetry stream 214 to the receiver of the relay satellite 104 at the updated Doppler corrected frequency in step 440. The processor 310 sets the updated position of the HSP 202 as the previous position of the HSP 202, in step 442, and then determines whether to end the transmission of the telemetry stream 214 in decision step 444. If the processor 310 ends the transmission, the process ends 448. If instead, the processor 310 does not end the transmission, the process repeats by returning to step 424 where the processor 310 determines a new updated position for the HSP 202.

It will be understood that various aspects or details of the implementations may be changed without departing from the scope of the invention. It is not exhaustive and does not limit the claimed inventions to the precise form disclosed. Furthermore, the foregoing description is for the purpose of illustration only, and not for the purpose of limitation. Modifications and variations are possible in light of the above description or may be acquired from practicing the invention. The claims and their equivalents define the scope of the invention.

What is claimed is:

1. A method for compensating for high Doppler in a telemetry stream with a high-speed platform telemetry system ("HSPTS"), wherein the high Doppler is created by a high-speed platform ("HSP"), the HSP is in signal communication with a first station, the telemetry stream is between the HSP and the first station, and the HSP has a platform transmitter that transmits the telemetry stream initially at a first frequency to a first station receiver, the method comprising:
   determining a first position for the HSP;
   determining a position of the first station;
   determining a relative rate of travel of the HSP along a travel path of the HSP from the first position of the HSP to the position of the first station;
   determining whether the relative rate of travel of the HSP is in a direction approaching or receding from the first station;
   determining a Doppler correction factor based on the relative rate of travel of the HSP and the direction approaching or receding from the first station;
   offsetting the first frequency of the platform transmitter by the Doppler correction factor to create a first Doppler corrected frequency; and
   transmitting the telemetry stream to the first station receiver at the first Doppler corrected frequency.

2. The method of claim 1,
   wherein the first Doppler corrected frequency has a frequency value that will result in the telemetry stream being received at the first station receiver with an apparent frequency approximately equal to the first frequency and
   wherein the received apparent frequency of the telemetry stream will appear to have approximately zero Doppler effect.

3. The method of claim 2, wherein determining the Doppler correction factor based on the relative rate of travel of the HSP includes
   determining a positive value for the Doppler correction factor if the relative rate of travel of the HSP is in a direction approaching the first station and
   determining a negative value for the Doppler correction factor if the relative rate of travel of the HSP is in a direction receding from the first station.

4. The method of claim 3, further including the steps of
   (a) setting the first position of the HSP as a previous position of the HSP,
   (b) determining an updated position for the HSP,
   (c) determining an updated relative rate of travel of the HSP from the updated position for the HSP to the position of the first station, (d) determining whether the updated relative rate of travel of the HSP is in a direction approaching or receding from the first station, (e) determining an updated Doppler correction factor based on the updated relative rate of travel of the HSP, (f) offsetting the first frequency of the platform transmitter by the updated Doppler correction factor to create an updated Doppler corrected frequency, (g) transmitting the telemetry stream to the first station receiver at the updated Doppler corrected frequency, (h) setting the updated position of the HSP as the previous position of the HSP, and (i) repeating steps (b) through (h) until an end of transmission of the telemetry stream.

5. The method of claim 4, wherein the updated Doppler corrected frequency has a frequency value that will result in the telemetry stream being received at the first station receiver with an apparent frequency approximately equal to the first frequency and wherein the received apparent frequency of the telemetry stream will appear to have approximately zero Doppler effect.

6. The method of claim 5, wherein determining the updated Doppler correction factor based on the relative rate of travel of the HSP includes determining an updated positive value for the updated Doppler correction factor if the relative rate of travel of the HSP is in a direction approaching the first station and determining an updated negative value for the updated Doppler correction factor if the relative rate of travel of the HSP is in a direction receding from the first station.

7. The method of claim 6, wherein determining the updated Doppler correction factor based on the relative rate of travel of the HSP further includes determining whether to switch from the updated positive value for the updated Doppler correction factor to the updated negative value for the updated Doppler correction factor if the updated position for the HSP passes through a transition position along the travel path of the HSP, wherein the transition position is a position along the travel path of the HSP that is nearest to the first station.

8. The method of claim 7, wherein determining the position of the first station includes determining the position of the first station from an on-board real-time Doppler map database stored on the HSP.

9. The method of claim 8, wherein determining the first position for the HSP includes determining the first position with a Global Positioning System ("GPS") receiver.

10. The method of claim 9, further including translating the received telemetry stream to a satellite downlink signal, and transmitting the satellite downlink signal to a ground station with a first station transmitter, wherein the first frequency is a center frequency of operation of the telemetry stream, the travel path of the HSP is a flight path of the HSP, the telemetry stream is a satellite uplink signal, the first station is a relay satellite selected from the group consisting of a tracking and data relay satellite ("TDRS"), Inmarsat, Iridium, and GlobalStar, the on-board real-time Doppler map database includes HSP and relay satellite data that corresponds to velocity, acceleration, time, and time-base plus current relay satellite ephemerides, and the HSP is selected from the group consisting of a hypersonic vehicle, launch vehicle, upper-stage of a launch vehicle, and high-speed missile.

11. A method for securing telemetry stream data of a high-speed platform ("HSP") with a high-speed platform telemetry system ("HSPTS"), wherein the HSP is in signal communication with a first station, the telemetry stream is between the HSP and the first station, and the HSP has a platform transmitter that transmits the telemetry stream initially at a first frequency to a first station receiver, the method comprising:

determining a first position for the HSP;

determining a position of the first station;

determining a relative rate of travel of the HSP along a travel path of the HSP from the first position of the HSP to the position of the first station;

determining whether the relative rate of travel of the HSP is in a direction approaching or receding from the first station;

determining a Doppler correction factor based on the relative rate of travel of the HSP;

offsetting the first frequency of the platform transmitter by the Doppler correction factor to create a first Doppler corrected frequency; and transmitting the telemetry stream to the first station receiver at the first Doppler corrected frequency, wherein the first Doppler corrected frequency has a frequency value that will result in the telemetry stream being received at the first station receiver with an apparent frequency approximately equal to the first frequency and wherein the received apparent frequency of the telemetry stream will appear to have approximately zero Doppler effect.

12. The method of claim 11, wherein determining the Doppler correction factor based on the relative rate of travel of the HSP includes determining a positive value for the Doppler correction factor if the relative rate of travel of the HSP is in a direction approaching the first station and determining a negative value for the Doppler correction factor if the relative rate of travel of the HSP is in a direction receding from the first station.

13. The method of claim 12, further including the steps of (a) setting the first position of the HSP as a previous position of the HSP, (b) determining an updated position for the HSP, (c) determining an updated relative rate of travel of the HSP from the updated position for the HSP to the position of the first station, (d) determining whether the updated relative rate of travel of the HSP is in a direction approaching or receding from the first station, (e) determining an updated Doppler correction factor based on the updated relative rate of travel of the HSP, (f) offsetting the first frequency of the platform transmitter by the updated Doppler correction factor to create an updated Doppler corrected frequency, (g) transmitting the telemetry stream to the first station receiver at the updated Doppler corrected frequency, (h) setting the updated position of the HSP as the previous position of the HSP, and (i) repeating steps (b) through (h) until an end of transmission of the telemetry stream, wherein the updated Doppler corrected frequency has a frequency value that will result in the telemetry stream being received at the first station receiver with an apparent frequency approximately equal to the first frequency, wherein the received apparent frequency of the telemetry stream will appear to have approximately zero Doppler effect, and wherein determining the updated Doppler correction factor based on the relative rate of travel of the HSP includes determining an updated positive value for the updated Doppler correction factor if the relative rate of travel of the HSP is in a direction approaching the first station and determining an updated negative value for the updated Doppler correction factor if the relative rate of travel of the HSP is in a direction receding from the first station.

14. The method of claim 13, wherein determining the updated Doppler correction factor based on the relative rate of travel of the HSP further includes determining whether to switch from the updated positive value for the updated Doppler correction factor to the updated negative value for the updated Doppler correction factor if the updated position for the HSP passes through a transition position along the travel path of the HSP, wherein the transition position is a position along the travel path of the HSP that is nearest to the first station and wherein determining the position of the first station includes determining the position of the first station from an on-board real-time Doppler map database stored on the HSP.

15. The method of claim 14, wherein determining the first position for the HSP includes determining the first position with a Global Positioning System ("GPS") receiver.

16. The method of claim 15, further including translating the received telemetry stream to a satellite downlink signal, and transmitting the satellite downlink signal to a ground station with a first station transmitter, wherein the first frequency is a center frequency of operation of the telemetry stream, the travel path of the HSP is a flight path of the HSP, the telemetry stream is a satellite uplink signal, the first station is a relay satellite selected from the group consisting of a tracking and data relay satellite ("TDRS"), Inmarsat, Iridium, and GlobalStar, the on-board real-time Doppler map database includes HSP and relay satellite data that corresponds to velocity, acceleration, time, time-base plus current relay satellite ephemerides, and the HSP is selected from the group consisting of a hypersonic vehicle, launch vehicle, upper-stage of a launch vehicle, and high-speed missile.

17. A high-speed platform telemetry system ("HSPTS"), within a high-speed platform ("HSP"), for compensating for high Doppler in a telemetry stream, wherein the HSP is in signal communication with a first station, the telemetry stream is transmitted between the HSP and the first station, and the high Doppler is created by the HSP as the HSP moves along a travel path that passes near the first station, the HSPTS comprising:

a platform transmitter, wherein the platform transmitter is configured to transmit the telemetry stream to the first station and operate within a predetermined frequency bandwidth having a center frequency of operation;

an on-board storage device having a real-time Doppler map database and navigation information corresponding to the travel path of the HSP, wherein the real-time Doppler map database includes a position for the first station;

a position location device, wherein the position location device is configured to determine a plurality of positions of the HSP along the travel path of the HSP;

a processor in signal communication with the position location device and the on-board storage device, wherein the processor is configured to determine the position of the first station from the real-time Doppler map database, determine a plurality of relative rates of travel of the HSP along the travel path of the HSP from the first position of the HSP to the position of the first station, and determine a plurality of Doppler correction factors based on the plurality of relative rates of travel of the HSP; and a frequency offset circuit in signal communication with the platform transmitter and the processor, wherein the frequency offset circuit is configured to offset the center frequency of operation of the platform transmitter by the plurality of Doppler correction factors to create a plurality of Doppler corrected frequencies.

18. The HSPTS of claim 17, wherein the processor is configured to determine the plurality of Doppler correction factors based on the plurality of relative rates of travel of the HSP by determining a positive value for the Doppler correction factor if the relative rate of travel of the HSP is in a direction approaching the first station and a negative value for the Doppler correction factor if the relative rate of travel of the HSP is in a direction receding from the first station.

19. The HSPTS of claim 18, wherein each Doppler corrected frequency, of the plurality of Doppler corrected frequencies, will have a frequency value that will result in the telemetry stream being received at a first station receiver of the first station with an apparent frequency approximately equal to a first frequency within the predetermined frequency bandwidth of the platform transmitter and wherein the received apparent frequency of the telemetry stream will appear to have approximately zero Doppler effect.

20. The HSPTS of claim 19, wherein the position location device is a Global Positioning System ("GPS") receiver, the real-time Doppler map database includes HSP and relay satellite data that corresponds to velocity, acceleration, time, time-base plus current relay satellite ephemerides, the HSP is selected from the group consisting of a hypersonic vehicle, launch vehicle, upper-stage of a launch vehicle, and high-speed missile, the first station is a relay satellite selected from the group consisting of a tracking and data relay satellite ("TDRS"), Inmarsat, Iridium, and GlobalStar, the telemetry stream is a satellite uplink signal, and the relay satellite is configured to receive the satellite uplink signal and convert it to a satellite downlink signal that is transmitted to a ground station.

* * * * *

UNITED STATES PATENT AND TRADEMARK OFFICE
CERTIFICATE OF CORRECTION

PATENT NO. : 9,516,617 B1  
APPLICATION NO. : 14/932935  
DATED : December 6, 2016  
INVENTOR(S) : Edward W. Dollahan, Jr.

Page 1 of 1

It is certified that error appears in the above-identified patent and that said Letters Patent is hereby corrected as shown below:

In the Specification

In Column 1, Line 3, as the first paragraphs following the title, please add the following:

GOVERNMENT LICENSE RIGHTS
This invention was made with Government support under HR0011-14-9-0005 awarded by Defense Advanced Research Projects Agency. The government has certain rights in this invention.

Signed and Sealed this
Twenty-fourth Day of July, 2018

Andrei Iancu
*Director of the United States Patent and Trademark Office*